United States Patent
Sanders et al.

(10) Patent No.: US 9,781,274 B2
(45) Date of Patent: Oct. 3, 2017

(54) PROVIDING A PROXY SERVER FEATURE AT AN ENDPOINT

(75) Inventors: Jeffery A. Sanders, Cocoa, FL (US); Michael H. McClung, Vienna, VA (US); Henry Chen, Plano, TX (US); Andrew J. Francke, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 3117 days.

(21) Appl. No.: 10/973,146

(22) Filed: Oct. 26, 2004

(65) Prior Publication Data

US 2006/0089991 A1     Apr. 27, 2006

(51) Int. Cl.
| | |
|---|---|
| *G06F 15/16* | (2006.01) |
| *H04M 7/00* | (2006.01) |
| *H04M 1/253* | (2006.01) |
| *H04L 29/06* | (2006.01) |

(52) U.S. Cl.
CPC ........ *H04M 7/0075* (2013.01); *H04L 65/105* (2013.01); *H04L 65/1053* (2013.01); *H04L 65/1069* (2013.01); *H04L 65/1073* (2013.01); *H04M 1/2535* (2013.01)

(58) Field of Classification Search
USPC ........................................................ 709/227
See application file for complete search history.

(56) References Cited

U.S. PATENT DOCUMENTS

| | | | |
|---|---|---|---|
| 6,667,968 B1* | 12/2003 | Tran | 370/352 |
| 7,012,888 B2* | 3/2006 | Schoeneberger et al. | 370/217 |
| 7,072,303 B2* | 7/2006 | MeLampy et al. | 370/238 |
| 7,139,838 B1* | 11/2006 | Squire et al. | 709/242 |
| 2002/0042832 A1* | 4/2002 | Fallentine et al. | 709/230 |
| 2002/0085549 A1* | 7/2002 | Reza et al. | 370/389 |
| 2002/0085696 A1* | 7/2002 | Martin et al. | 379/201.03 |
| 2002/0169887 A1* | 11/2002 | MeLampy et al. | 709/231 |
| 2002/0176404 A1 | 11/2002 | Girard | 370/352 |
| 2004/0028035 A1* | 2/2004 | Read | 370/352 |
| 2004/0131060 A1* | 7/2004 | Newberg et al. | 370/390 |
| 2005/0033985 A1* | 2/2005 | Xu et al. | 713/201 |
| 2005/0193124 A1* | 9/2005 | Chou et al. | 709/228 |
| 2006/0047742 A1* | 3/2006 | O'Neill et al. | 709/203 |
| 2006/0067323 A1* | 3/2006 | Beck et al. | 370/395.2 |

OTHER PUBLICATIONS

"Zero Configuration Networking (Zeroconf)", http://www.zeroconf.org, 3 pages. Printed Oct. 2004.
"Rendezvous", Developer Connection, Copyright © 2004, Apple Computer, Inc., http://developer.apple.com/macosx/rendezvous, 4 pages. Printed Oct. 2004.
Sub: First Examination Report issued by the Government of India Patent Office; Application No. 2513/DELNP/2007, Feb. 27, 2012.
European Patent Office, Communication and Supplementary European Search Report for Application No. 05812791.1-1853, 6 pages, received from foreign associate Dec. 15, 2014.

* cited by examiner

*Primary Examiner* — Alan S Chou
(74) *Attorney, Agent, or Firm* — Baker Botts L.L.P.

(57) ABSTRACT

Providing a proxy server feature includes initiating the proxy server feature at an endpoint of a number of endpoints. Registration information comprising addresses for the endpoints is received and then stored in a routing table at the endpoint. The endpoint locates a callee endpoint using the routing table in order to establish a session with the callee endpoint.

23 Claims, 2 Drawing Sheets

FIG. 5

PROVIDING A PROXY SERVER FEATURE AT AN ENDPOINT

TECHNICAL FIELD

This invention relates generally to the field of communications and more specifically to providing a proxy server feature at an endpoint.

BACKGROUND

As communications technologies develop, voice services and data services have increasingly converged. One such example is the use of Internet protocol (IP) technology to transport voice data. The use of IP technology enables voice traffic to gain the benefits of packet communication protocols. Similarly, other technologies may provide benefits when applied to telephony systems. Discovering appropriate technologies and uses for these technologies, however, remains a daunting challenge.

SUMMARY OF THE DISCLOSURE

In accordance with the present invention, disadvantages and problems associated with previous techniques for providing proxy server features may be reduced or eliminated.

According to one embodiment of the present invention, providing a proxy server feature includes initiating the proxy server feature at an endpoint of a number of endpoints. Registration information comprising addresses for the endpoints is received and then stored in a routing table at the endpoint. The endpoint locates a callee endpoint using the routing table in order to establish a session with the callee endpoint.

Certain embodiments of the invention may provide one or more technical advantages. A technical advantage of one embodiment may be that one or more endpoints may each have a proxy server feature. The proxy server feature may allow an endpoint to operate as a proxy server. Another technical advantage of one embodiment may be that a service framework of an endpoint provides a proxy server feature. The service framework may access a web page comprising feature logic defining the proxy server feature. The web page may be executed to readily provide the proxy server feature.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
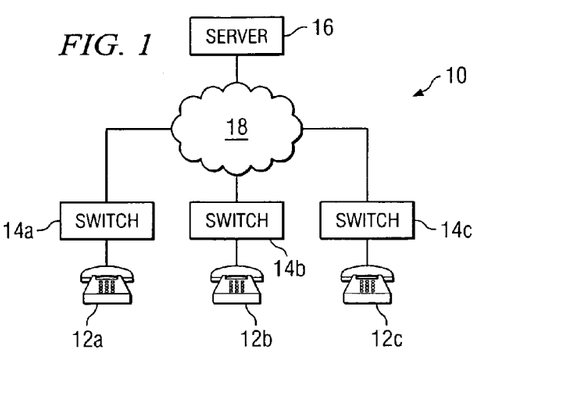
FIG. 1 is a block diagram of one embodiment of a system that includes endpoints.

FIG. 1 is a block diagram of one embodiment of a system 10 that includes endpoints 12. According to the embodiment, an endpoint 12a may operate as a proxy server for certain services. As an example, endpoint 12a may operate as a session initiation protocol (SIP) proxy server that provides services such as registering endpoints 12, identifying states of endpoints 12, translating addresses of endpoints 12, or any combination of the preceding. SIP attempts to move communication intelligence to the periphery of a network, the embodiment extends the communication intelligence endpoint 12a operating as a proxy server.

According to the illustrated embodiment, system 10 includes one or more endpoints 12, one or more switches 14, a server 16, and a communications network 18 coupled as shown. An endpoint 12 represents any suitable combination or arrangement of logic for providing communication services such as telephony services. Logic may refer to hardware, software, or any combination of hardware and software. Examples of an endpoint 12 include a communication device such as a telephone, a cell phone, a personal digital assistant, a voice appliance, an answering machine, a facsimile machine, a computer, or other device. An embodiment of an endpoint 12 is described in greater detail with reference to FIG. 2.

Referring to FIG. 1, an endpoint 12 may provide certain proxy server features. A proxy server feature may refer to a feature that mediates communications between endpoints 12 or between an endpoint 12 and other network equipment. Proxy server features may support the establishment, modification, and termination of any suitable communication session. For example, a proxy server feature may support negotiating features and capabilities of a session at the time the session is being established, and modifying designated capabilities once the session has been established. Specific proxy server features may include registering endpoints 12, identifying states of endpoints 12, and translating addresses of endpoints 12. Other specific proxy server features may also include building and maintaining routing tables for directing sessions. Routing tables permit endpoints 12 to match dialed digits to the addresses for reaching an endpoint 12 associated with the dialed digits.

According to one embodiment, an endpoint 12 may include a service framework that provides proxy server features by executing feature logic. Feature logic manipulates lower-level functions of endpoint 12 to implement a particular state to provide a proxy server feature. Feature logic may be written in any suitable language such as JAVA or a text-based language such as extensible markup language (XML). The feature logic may be included in text files stored at an endpoint 12 or in web pages loaded and executed by a service framework of an endpoint 12.

Feature logic may include instructions for endpoint outputs, endpoint operations, or both. An endpoint output refers to information presented through an endpoint interface, such as a sound, light, or display. Feature logic may instruct an output processing module to handle commands that interact with the endpoint interface. For example, feature logic may instruct an output processing module to turn on a flashing light emitting diode (LED) to indicate a waiting voicemail message.

An endpoint operation refers to an operation of endpoint 12. As an example, an endpoint operation may generate messages to an external element such as server 14 or other endpoints 12. As another example, a endpoint operation may command internal operations, such as linking multiple call legs within a conference bridge, routing a call leg to a speaker, or initiating a timer. Feature logic may instruct an operations processing module to handle commands that control the components of endpoint 12. State machines such as an output processing module and operations processing module may work in tandem to effect a procedure controlled by a command.

Feature logic associated with a proxy server feature may comprise logic associated with making routing decisions. Example routing decisions include handling registration messages; routing session establishment invitations; forking messages for multiple recipients; forwarding, redirecting, or rejecting session establishment invitations; and handling event subscriptions and notifications. According to one embodiment, feature logic may include an event handler that specifies a response of endpoint 12 to an event. Events include internal events and external events, for example, input from users, other endpoints 12, or external devices. Upon detecting an event, a state machine may access a web page to determine whether the page includes an event handler for the detected event. If so, the state machine responds to the event according to the instructions within the event handler. An event handler can link to another location within the feature logic, link to another web page, or process the event.

The service framework may also provide other features, such as call hold, call transfer, call pick-up, call distribution, call conferencing, video transmission, voice messaging, and instant messaging, other feature, or any combination of the preceding. One embodiment of a service framework is described in greater detail with reference to FIG. 3.

Referring to FIG. 1, switches 14 represent network equipment operable to route, translate, or both route and translate communications. Server 16 comprises any suitable combination or arrangement of logic operating to support communication services provided by endpoints 12. Server 16 may provide a centralized repository of web pages for use by endpoints 12 to provide proxy server features. Server 16 may communicate the web pages from memory 20 to endpoints 12 in response to web page requests. Server 16 may reside within endpoints 12 or in system 10.

Network 18 represents any suitable combination or arrangement of components supporting communications between endpoints 12 and server 14. For example, network 18 may include one or more local area networks (LANs), one or more wide area network (WANs), elements of a public switched telephone networks (PSTN), portions of the Internet, components of other suitable communications networks, or any combination of the preceding.

According to one embodiment of operation, endpoint 12*a* may operate as a proxy server. Other endpoints 12*b-c* may be required to register with endpoint 12*a* to provide endpoints 12*a* with registration information such as Internet protocol (IP) addresses. Endpoint 12*a* stores the registration information in a routing table. If an endpoint 12*b-c* initiates a communication session, endpoint 12*a* provides the registration information to establish the communication session.

According to another embodiment, some or all endpoints 12*a-c* may operate as proxy servers. Endpoints 12 register with the endpoints 12*a-c* operating as proxy servers, and endpoints 12*a-c* store the registration information in their respective routing tables. Registration information may be distributed among the multiple endpoints 12*a-c* operating as proxy servers in any suitable manner. For example, endpoints 12 may register with an endpoint 12*a*, and endpoint 12*a* distributes the registration information to other endpoints 12*b-c*. As another example, endpoints 12 may register with all of the endpoints 12*a-c* operating as proxy servers. Multicast communication may be used for the call control signaling.

According to yet another embodiment, an endpoint 12*a* may operate as a primary proxy server, and another endpoint 12*b* may operate as a secondary proxy server. Endpoints 12 may register with endpoints 12*a-b*, and endpoints 12*a-b* may maintain the registration information in their respective routing tables. Primary proxy server 12*a* operates as a proxy server, and secondary proxy server endpoint 12*b* operates as a proxy server if primary proxy server endpoint 12*a* is not operating.

According to one embodiment, endpoint 12*a* operating as a proxy server may request that another endpoint 12*b* execute commands to provide proxy server features. For example, endpoint 12*a* may request that endpoint 12*b* register with endpoint 12*a*. Endpoint 12*a* may make the request by providing web pages for executing the commands to endpoint 12*b*. The web pages may be provided using any suitable techniques. For example, endpoint 12*a* may communicate web pages directly to endpoint 12*b* using hypertext transfer protocol (HTTP). As another example, endpoint 12*a* may send endpoint 12*b* links to the web pages.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of switch 14 and server 16 may be performed by one module, or the operations of server 16 may be performed by more than one module, so long as certain endpoints 12 provide proxy server features. Additionally, operations of system 10 may be performed using any suitable logic comprising software, hardware, other logic, or any suitable combination of the preceding. As used in this document, "each" refers to each member of a set or each member of a subset of a set.

Figure 2:
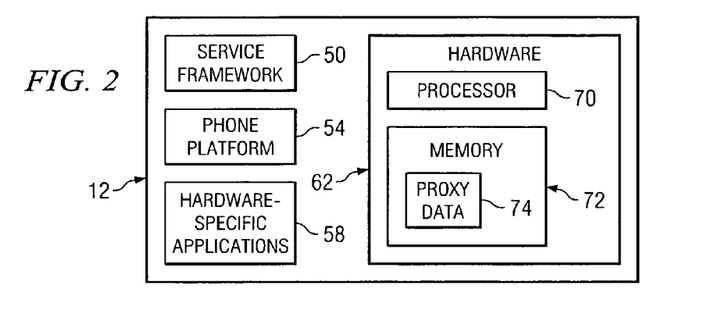
FIG. 2 is a block diagram of one embodiment of an endpoint that includes a service framework.

FIG. 2 is a block diagram of one embodiment of an endpoint 12 that includes a service framework 50. According to the illustrated embodiment, endpoint 12 includes service framework 50, a phone platform 54, hardware-specific applications 58, and hardware 62. Service framework 50 provides proxy components that can be monitored and controlled by feature logic. The feature logic may be included in web pages loaded and executed by service framework 50. One embodiment of service framework 50 is described in greater detail with reference to FIG. 3.

Phone platform 54 includes software that allows endpoint 12 to communicate. Phone platform 54 may include code, configuration data, applications, media, other information, or any combination of the preceding. Code represents logic executed by the elements of endpoint 12 to implement functionality. According to one embodiment, code may include logic used by a state engine to interpret and execute feature logic, such as a real-time interpreter operable to run downloaded feature logic. Phone platform 54 may include a JAVA native interface (JNI) and a JAVA virtual machine that interprets executable byte code as a JAVA application is running.

Configuration data represents settings used by endpoint 12 during initialization and operation. For example, configuration data may identify a particular server 14 from which endpoint 12 should request web pages. Applications include programs that provide underlying management and control of the operation of endpoint 12. For example, applications may include a media manager, an application manager, a property manager, a call agent, other program, or any combination of the preceding. One or more applications may be managed by an application manager. Media maintained within applications can include data such as user recorded prompts for voicemail applications, messages from other users, or other appropriate information.

Hardware-specific applications 58 include programs for controlling hardware 62. Examples of hardware-specific applications 58 include native services or a native operating systems. Hardware 50 may refer to electronic, mechanical, or electromechanical components of endpoint 12. According to the illustrated embodiment, hardware 50 includes a processor 70 and a memory 72. Processor 50 manipulates data to control the operation of endpoint 12. Memory 72 stores and facilitates retrieval of information used by the processor, and may include random access memory (RAM), read only memory (ROM), magnetic drives, disk drives, compact disk (CD) drives, digital video disk (DVD) drives, removable media storage, any other suitable data storage device, or a combination of any of the preceding.

According to the illustrated embodiment, memory 72 stores proxy data 74. Proxy data 74 includes information that allows endpoint to provide proxy server features. For example, proxy data 74 may include a routing table that allows endpoint to establish communication sessions among endpoints 12. Memory 72 may also store feature logic. As an example, endpoint 12 may maintain a limited set of commonly used web pages within memory 72 and request other web pages from server 16.

Hardware 50 may include other suitable components, for example, interface modules and signal processing modules. Interface modules may include user interface modules and network interface modules. User interface modules provide for the exchange of information with users of endpoint 12, and may include a speaker, a microphone, a display, an input interface, other module, or any combination of the preceding. A speaker generates audio signals, and a microphone receives and processes audio signals from a user. A display presents information to a user, and may include an LED, a graphical display, or other device for visually displaying or otherwise presenting information. An input interface represents any suitable element for receiving input from a user. For example, a user input interface may include a number keypad, one or more buttons referencing portions of display, a pointing device, other appropriate input interface, or any combination of the preceding.

Network interface modules provide for communication between endpoint 12 and other equipment. For example, a network interface may link to switch 32 and provide for packet-based voice communications. A network interface may provide for coupling to any suitable communications equipment using any appropriate techniques and protocols. A network interface may support any appropriate wireless, wireline, or both wireless and wireline communications protocol.

Signal processing modules provide for the manipulation and enhancement of signals. According to particular embodiments, signal processing modules may include digital signal processing capabilities for compression, echo cancellation, silence detection, or other appropriate signal processing.

Modifications, additions, or omissions may be made to endpoint 12 without departing from the scope of the invention. The components of endpoint 12 may be integrated or separated according to particular needs. Moreover, the operations of endpoint 12 may be performed by more, fewer, or other modules. Additionally, operations of endpoint 12 may be performed using any suitable logic comprising software, hardware, other logic, or any suitable combination of the preceding.

Figure 3:
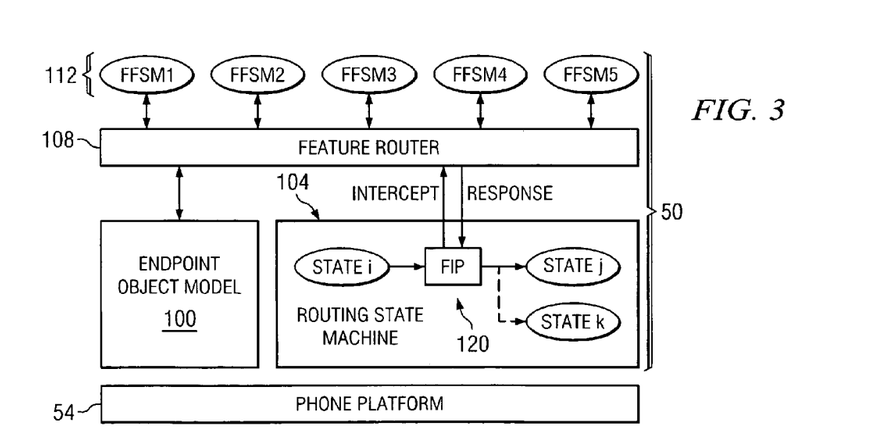
FIG. 3 is a block diagram of one embodiment of a service framework of the endpoint of FIG. 2.

FIG. 3 is a block diagram of one embodiment of service framework 50 of endpoint 12. Service framework 50 may allow endpoint 12 to provide proxy server features using any suitable method. An example method is described in more detail with reference to FIG. 4.

According to the illustrated embodiment, service framework 50 includes an endpoint object model 100, one or more state machines 104, a feature router 108, and feature finite state machines (FFSMs) 112 coupled as shown. Endpoint object model 100 includes objects that have platform logic that exposes interaction points or provides a supporting function. An object represents an aspect of endpoint 12, such as a component of endpoint 12. For example, an object may represent a ringer, device, line, call, or dialog. An event occurring at an object may initiate one or more states of endpoint 12.

In general, a state machine tracks a current state and defines a next state according to a state process. A state process may refer to a process that defines the next state given a previous state and other conditions, and may be described using a state diagram. A state machine loads and executes instructions of a state process to implement the state process.

A state machine 104 is associated with an endpoint object defined by endpoint object model 100. In the illustrated embodiment, routing state machine 104 tracks the current state of phone platform 54 and defines the next state according to an endpoint state process. An endpoint state process refers to a state process that controls the operation of endpoint 12. An endpoint state process may include a feature interaction point (FIP), which refers to a point of the state process at which feature router 108 may intercept the state process and provide a response.

According to the illustrated embodiment, a state diagram 120 indicates that state i is followed by a feature interaction point. Feature router 108 intercepts the process at the feature interaction point, routes the intercept to one or more feature finite state machines, determines a response from the feature finite state machines, and provides the response. Depending upon the response, the next state may be state j or state k. Example routing state machines 104 include device, line, call, and dialog state machines.

Feature router 108 coordinates feature finite state machines 100 and routing state machines 112 to provide features. Feature router 108 intercepts a state process and provides a response. Feature router 108 may determine the response according to instructions provided by feature finite state machines 112, and resolve conflicts between contradictory instructions.

Feature finite state machines 112 are state machines that provide instructions to implement features. A feature finite state machine 112 is notified of the current state of an endpoint state process occurring at routing state machine 104, and defines the next state according a feature state process. A feature state process may refer to a process that provides a telephony feature such as a proxy server feature.

According to one embodiment of operation, feature finite state machines 112 register with feature router 108 to obtain an intercept at a specific point of a state process managed by routing state machines 104. Feature finite state machines 112 may be allowed to register for notification at specific feature interaction points. When the specific point occurs, state machine 104 provides an intercept to feature router 108, which in turn notifies feature finite state machines 112. In response, feature finite state machines 112 provide instructions to feature router 108. Feature router 108 determines a response for the event.

In certain situations, feature router 108 may receive conflicting instructions from feature finite state machines 112. Feature router 108 may resolve the conflict to determine the response according to the priority of the features. Feature router 108 then sends the response to state machine 104.

Modifications, additions, or omissions may be made to service framework 50 without departing from the scope of the invention. The components of service framework 50 may be integrated or separated according to particular needs. Moreover, the operations of service framework 50 may be performed by more, fewer, or other modules. For example, the operations of feature router 108 may be performed by more than one module. Additionally, operations of service framework 50 may be performed using any suitable logic comprising software, hardware, other logic, or any suitable combination of the preceding.

Figure 4:
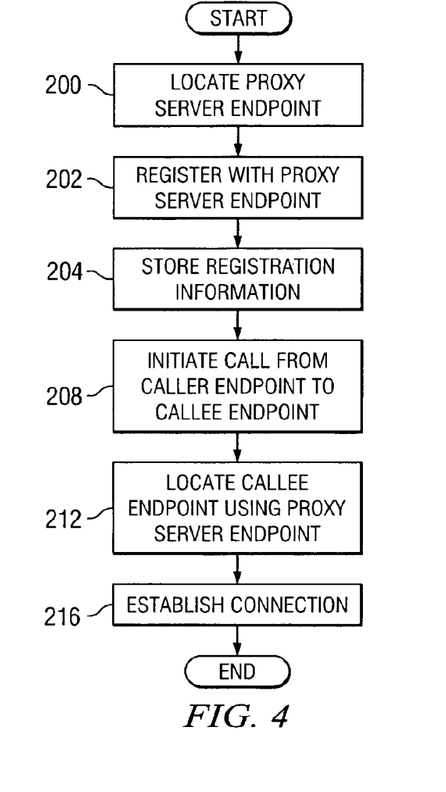
FIG. 4 is a flowchart of one embodiment of a method for providing a proxy server feature using an endpoint of FIG. 1.

FIG. 4 is a flowchart of one embodiment of a method for providing a proxy server feature using endpoint 12 of FIG. 1. According to the embodiment, endpoint 12a operates as a proxy server for endpoints 12a-c. Proxy server endpoint 12a has a service framework 50 that includes a feature finite state machine 112 that provides proxy server features. Any combination of endpoints 12, however, may operate as proxy servers for system 10.

The method begins at step 200, where endpoints 12 locate proxy server endpoint 12a. Endpoints 12 may locate proxy server endpoint 12a using any suitable discovery procedure such as a standard SIP proxy discovery protocol. Endpoints 12 register with proxy server endpoint 12a at step 202. Endpoints 12 may register by providing proxy server endpoint 12a with registration information such as IP addresses. According to one embodiment, proxy server endpoint 12a may instruct endpoints 12 to provide the registration information by providing endpoints 12b-c with web pages having commands instructing endpoints 12b-c to provide the information.

Proxy server endpoint 12a stores the registration information at step 204. According to one embodiment, proxy server endpoint 12a may store the information in a routing table of proxy data 74 stored in memory 72 of endpoint 12a. The routing table may associate each endpoint 12a-c with its registration information. For example, the routing table may associate endpoint 12b with the IP address of 12b, and may associate endpoint 12c with the IP address for 12c.

A caller endpoint 12b initiates a session with callee endpoint 12c at step 208. According to one embodiment, web pages may instruct caller endpoint 12b to initiate a session by sending an invite message to proxy server endpoint 12a. Proxy server endpoint 12a locates callee endpoint 12c at step 212. For example, proxy server endpoint 12a may locate callee endpoint 12c using a routing table associating callee endpoint 12c with the IP address for endpoint 12c.

The connection is established at step 216. For example, proxy server endpoint 12a may forward the invite message to callee endpoint 12c. Callee endpoint 12c may then send a response message to proxy server endpoint 12a, which forwards the response message to caller endpoint 12b. Alternatively, callee endpoint 12c may send the response directly to caller endpoint 12b. After establishing the connection, the method terminates.

Modifications, additions, or omissions may be made to the method without departing from the scope of the invention. The method may include more, fewer, or other steps. Additionally, steps may be performed in any suitable order without departing from the scope of the invention.

Figure 5:
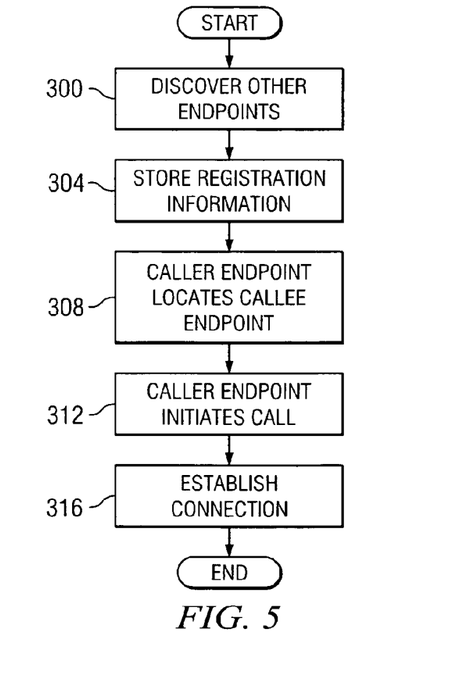
FIG. 5 is a flowchart of another embodiment of a method for providing a proxy server feature using the endpoints of FIG. 1.

FIG. 5 is a flowchart of one embodiment of a method for providing a proxy server feature using endpoints 12 of FIG. 1. According to the embodiment, each endpoint 12 has a service framework 50 that includes a feature finite state machine 112 that provides proxy server features. Any combination of endpoints 12, however, may operate as proxy servers for system 10.

The method begins at step 300, where endpoints 12 discover other endpoints 12. Endpoints 12 may discover other endpoints 12 using any suitable discovery procedure such as a zero configuration networking (zeroconf) procedure. For example, endpoints 12 may broadcast their registration information, such as IP addresses, to the other endpoints 12. According to one embodiment, endpoints 12 may have feature logic instructing them to broadcast their registration information during initialization.

Endpoints 12 store the registration information of the other endpoints 12 at step 304. According to one embodiment, an endpoint 12 may store the information in a routing table of proxy data 74 stored in memory 72 of endpoint 12. A caller endpoint 12b locates callee endpoint 12c at step 308. For example, caller endpoint 12b may locate callee endpoint 12c using the routing table.

Caller endpoint initiates a session with callee endpoint 12c at step 312. Caller endpoint 12b may initiate a session in accordance with feature logic. The connection is established at step 316. For example, callee endpoint 12c may send a response to caller endpoint 12b to establish the session. After establishing the connection, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that one or more endpoints may each have a proxy server feature. The proxy server feature may allow an endpoint to operate as a proxy server. Another technical advantage of one embodiment may be that a service framework of an endpoint provides a proxy server feature. The service framework may access a web page comprising feature logic defining the proxy server feature. The web page may be executed to readily provide the proxy server feature.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing a proxy server feature, comprising:
   initiating a proxy server feature at a first endpoint of a plurality of endpoints, wherein each endpoint of the plurality of endpoints is operable to provide the proxy server feature, and wherein initiating the proxy server feature at the first endpoint of the plurality of endpoints further comprises:
      accessing feature logic using a service framework at the first endpoint, the feature logic stored on the first endpoint operating as the proxy server, the feature logic defining the proxy server feature and an event handler that indicates a response to an event; and
      initiating the proxy server feature by executing the feature logic stored on the first endpoint;
   receiving registration information corresponding to the plurality of endpoints, the registration information corresponding to an endpoint comprising an address for the endpoint, and wherein receiving registration information corresponding to the plurality of endpoints further comprises:
      broadcasting registration information from the first endpoint to one or more other endpoints of the plurality of endpoints; and
      receiving at the first endpoint registration information from the other endpoints of the plurality of endpoints;
   storing the registration information in a routing table at the first endpoint;
   locating a callee endpoint of the plurality of endpoints using the routing table in order to establish a session with the callee endpoint;
   intercepting an endpoint state process of the session at a feature interaction point; and
   determining a next state of the endpoint state process according to a feature finite state machine corresponding to the feature interaction point;
   determining whether the event occurs; and
   if the event occurs, accessing a web page stored on the first endpoint to determine whether the web page includes the event handler for the event and responding to the event according to instructions within the event handler stored on the first endpoint.

2. The method of claim 1, wherein:
   the first endpoint comprises a primary endpoint; and
   the plurality of endpoints comprises a secondary endpoint operable to provide the proxy server feature if the primary endpoint fails to provide the proxy server feature.

3. The method of claim 1, wherein:
   the first endpoint is operable to provide the proxy server feature to one or more other endpoints of the plurality of endpoints; and
   receiving registration information corresponding to the plurality of endpoints further comprises:
      instructing the other endpoints to register at the first endpoint.

4. The method of claim 1, wherein:
   the first endpoint is operable to provide the proxy server feature to one or more other endpoints of the plurality of endpoints; and
   locating the callee endpoint of the plurality of endpoints using the routing table further comprises:
      receiving an invite message from a caller endpoint of the other endpoints; and
      locating the callee endpoint in response to receiving the invite message.

5. A method for providing a proxy server feature, comprising:
   initiating a proxy server feature at a first endpoint of a plurality of endpoints, wherein each endpoint of the plurality of endpoints is operable to provide the proxy server feature, and wherein initiating the proxy server feature at the first endpoint of the plurality of endpoints further comprises:
      accessing feature logic using a service framework at the first endpoint, the feature logic stored on the first endpoint operating as the proxy server, the feature logic defining the proxy server feature and an event handler that indicates a response to an event; and
      initiating the proxy server feature by executing the feature logic stored on the first endpoint;
   receiving registration information corresponding to the plurality of endpoints, the registration information corresponding to an endpoint comprising an address for the endpoint, and wherein receiving registration information corresponding to the plurality of endpoints further comprises:
      receiving at the first endpoint registration information from a second endpoint of the plurality of endpoints; and
      providing the registration information to a third endpoint of the plurality of endpoints;
   storing the registration information in a routing table at the first endpoint;
   locating a callee endpoint of the plurality of endpoints using the routing table in order to establish a session with the callee endpoint;
   intercepting an endpoint state process of the session at a feature interaction point; and
   determining a next state of the endpoint state process according to a feature finite state machine corresponding to the feature interaction point;
   determining whether the event occurs; and
   if the event occurs, accessing a web page stored on the first endpoint to determine whether the web page includes the event handler for the event and responding to the event according to instructions within the event handler stored on the first endpoint.

6. A first endpoint of a plurality of endpoints, comprising:
   a memory operable to store a routing table; and
   a processor coupled to the memory and operable to:
      initiate a proxy server feature, wherein each endpoint of the plurality of endpoints is operable to provide the proxy server feature, and wherein initiating the proxy server feature at the first endpoint of the plurality of endpoints further comprises:
         accessing feature logic using a service framework, the feature logic stored on the first endpoint operating as the proxy server, the feature logic defining the proxy server feature and an event handler that indicates a response to an event; and
         initiating the proxy server feature by executing the feature logic stored on the first endpoint:
      receive registration information corresponding to the plurality of endpoints, the registration information corresponding to an endpoint comprising an address for the endpoint,
      record the registration information in the routing table; and locate a callee endpoint of the plurality of endpoints using the routing table in order to establish a session with the callee endpoint;

intercept an endpoint state process of the session at a feature interaction point; and determine a next state of the endpoint state process according to a feature finite state machine corresponding to the feature interaction point;

determine whether the event occurs; and if the event occurs, access a web page stored on the first endpoint to determine whether the web page includes the event handler for the event and respond to the event according to instructions within the event handler stored on the first endpoint, and wherein the processor is further operable to receive registration information corresponding to the plurality of endpoints by:

broadcasting registration information from the first endpoint to one or more other endpoints of the plurality of endpoints; and receiving at the first endpoint registration information from the other endpoints of the plurality of endpoints.

7. The endpoint of claim 6, wherein:

the first endpoint comprises a primary endpoint; and the plurality of endpoints comprises a secondary endpoint operable to provide the proxy server feature if the primary endpoint fails to provide the proxy server feature.

8. The endpoint of claim 6, wherein:

the first endpoint is operable to provide the proxy server feature to one or more other endpoints of the plurality of endpoints; and the processor is further operable to receive registration information corresponding to the plurality of endpoints by:

instructing the other endpoints to register at the first endpoint.

9. The endpoint of claim 6, wherein:

the first endpoint is operable to provide the proxy server feature to one or more other endpoints of the plurality of endpoints; and the processor is further operable to locate the callee endpoint of the plurality of endpoints using the routing table by:

receiving an invite message from a caller endpoint of the other endpoints; and locating the callee endpoint in response to receiving the invite message.

10. A first endpoint of a plurality of endpoints, comprising:

a memory operable to store a routing table; and a processor coupled to the memory and operable to:

initiate a proxy server feature, wherein each endpoint of the plurality of endpoints is operable to provide the proxy server feature, and wherein initiating the proxy server feature at the first endpoint of the plurality of endpoints further comprises:

accessing feature logic using a service framework, the feature logic stored on the first endpoint operating as the proxy server, the feature logic defining the proxy server feature and an event handler that indicates a response to an event; and initiating the proxy server feature by executing the feature logic stored on the first endpoint:

receive registration information corresponding to the plurality of endpoints, the registration information corresponding to an endpoint comprising an address for the endpoint, record the registration information in the routing table; and locate a callee endpoint of the plurality of endpoints using the routing table in order to establish a session with the callee endpoint;

intercept an endpoint state process of the session at a feature interaction point; and determine a next state of the endpoint state process according to a feature finite state machine corresponding to the feature interaction point;

determine whether the event occurs; and if the event occurs, access a web page stored on the first endpoint to determine whether the web page includes the event handler for the event and respond to the event according to instructions within the event handler stored on the first endpoint, and wherein the processor is further operable to receive registration information corresponding to the plurality of endpoints by:

receiving at the first endpoint registration information from a second endpoint of the plurality of endpoints; and providing the registration information to a third endpoint of the plurality of endpoints.

11. A non-transitory computer readable medium comprising logic for providing a proxy server feature, the logic when executed by a processor operable to:

initiate a proxy server feature at a first endpoint of a plurality of endpoints, wherein each endpoint of the plurality of endpoints is operable to provide the proxy server feature, and wherein initiating the proxy server feature at the first endpoint of the plurality of endpoints further comprises:

accessing feature logic using a service framework at the first endpoint, the feature logic stored on the first endpoint operating as the proxy server, the feature logic defining the proxy server feature and an event handler that indicates a response to an event; and initiating the proxy server feature by executing the feature logic stored on the first endpoint;

receive registration information corresponding to the plurality of endpoints, the registration information corresponding to an endpoint comprising an address for the endpoint;

record the registration information in a routing table at the first endpoint; and locate a callee endpoint of the plurality of endpoints using the routing table in order to establish a session with the callee endpoint;

intercept an endpoint state process of the session at a feature interaction point; and determine a next state of the endpoint state process according to a feature finite state machine corresponding to the feature interaction point;

determine whether the event occurs; and if the event occurs, access a web page stored on the first endpoint to determine whether the web page includes the event handler for the event and respond to the event according to instructions within the event handler stored on the first endpoint, and wherein the logic is further operable to receive registration information corresponding to the plurality of endpoints by:

broadcasting registration information from the first endpoint to one or more other endpoints of the plurality of endpoints; and receiving at the first endpoint registration information from the other endpoints of the plurality of endpoints.

12. The non-transitory computer readable medium of claim 11, wherein:
the first endpoint comprises a primary endpoint; and
the plurality of endpoints comprises a secondary endpoint operable to provide the proxy server feature if the primary endpoint fails to provide the proxy server feature.

13. The non-transitory computer readable medium of claim 11, wherein:
the first endpoint is operable to provide the proxy server feature to one or more other endpoints of the plurality of endpoints; and
the logic is further operable to receive registration information corresponding to the plurality of endpoints by:
instructing the other endpoints to register at the first endpoint.

14. The non-transitory computer readable medium of claim 11, wherein:
the first endpoint is operable to provide the proxy server feature to one or more other endpoints of the plurality of endpoints; and
the logic is further operable to locate the callee endpoint of the plurality of endpoints using the routing table by:
receiving an invite message from a caller endpoint of the other endpoints; and
locating the callee endpoint in response to receiving the invite message.

15. A non-transitory computer readable medium comprising logic for providing a proxy server feature, the logic when executed by a processor operable to:
initiate a proxy server feature at a first endpoint of a plurality of endpoints, wherein each endpoint of the plurality of endpoints is operable to provide the proxy server feature, and wherein initiating the proxy server feature at the first endpoint of the plurality of endpoints further comprises:
accessing feature logic using a service framework at the first endpoint, the feature logic stored on the first endpoint operating as the proxy server, the feature logic defining the proxy server feature and an event handler that indicates a response to an event; and
initiating the proxy server feature by executing the feature logic stored on the first endpoint;
receive registration information corresponding to the plurality of endpoints, the registration information corresponding to an endpoint comprising an address for the endpoint;
record the registration information in a routing table at the first endpoint; and
locate a callee endpoint of the plurality of endpoints using the routing table in order to establish a session with the callee endpoint;
intercept an endpoint state process of the session at a feature interaction point; and
determine a next state of the endpoint state process according to a feature finite state machine corresponding to the feature interaction point;
determine whether the event occurs; and
if the event occurs, access a web page stored on the first endpoint to determine whether the web page includes the event handler for the event and respond to the event according to instructions within the event handler stored on the first endpoint, and wherein the logic is further operable to receive registration information corresponding to the plurality of endpoints by:
receiving at the first endpoint registration information from a second endpoint of the plurality of endpoints; and
providing the registration information to a third endpoint of the plurality of endpoints.

16. A system for providing a proxy server feature, comprising:
a plurality of endpoints, each endpoint operable to provide registration information, the registration information corresponding to an endpoint comprising an address for the endpoint; and
a first endpoint of the plurality of endpoints operable to:
initiate a proxy server feature at a first endpoint of a plurality of endpoints, wherein initiating the proxy server feature at the first endpoint of the plurality of endpoints further comprises:
accessing feature logic using a service framework at the first endpoint, the feature logic stored on the first endpoint operating as the proxy server, the feature logic defining the proxy server feature and an event handler that indicates a response to an event; and
initiating the proxy server feature by executing the feature logic stored on the first endpoint;
receive the registration information corresponding to the other endpoints;
record the registration information in a routing table; and
locate a callee endpoint of the plurality of endpoints using the routing table in order to establish a session with the callee endpoint;
intercept an endpoint state process of the session at a feature interaction point; and
determine a next state of the endpoint state process according to a feature finite state machine corresponding to the feature interaction point;
determine whether the event occurs; and
if the event occurs, access a web page stored on the first endpoint to determine whether the web page includes the event handler for the event and respond to the event according to instructions within the event handler stored on the first endpoint, and
wherein each endpoint of the plurality of endpoints is operable to provide the proxy server feature by:
receiving registration information corresponding to the plurality of endpoints by:
broadcasting registration information to the other endpoints of the plurality of endpoints; and
receiving registration information from the other endpoints of the plurality of endpoints.

17. The system of claim 16, wherein each endpoint of the plurality of endpoints is operable to provide the proxy server feature by receiving registration information from the first endpoint.

18. The system of claim 16, wherein:
the first endpoint comprises a primary endpoint; and
the plurality of endpoints comprises a secondary endpoint operable to provide the proxy server feature if the primary endpoint fails to provide the proxy server feature.

19. The system of claim 16, wherein the first endpoint is operable to provide the proxy server feature to the other endpoints of the plurality of endpoints by:
   receiving registration information corresponding to the plurality of endpoints by:
      instructing the other endpoints to register at the first endpoint; and
      receiving at the first endpoint registration information from the other endpoints at the first endpoint.

20. The system of claim 16, wherein the first endpoint is operable to provide the proxy server feature to the other endpoints of the plurality of endpoints by:
   locating the callee endpoint of the plurality of endpoints using the routing table by:
      receiving an invite message from a caller endpoint of the other endpoints; and
      locating the callee endpoint in response to receiving the invite message.

21. A method for providing a proxy server feature, comprising:
   providing feature logic to a service framework of a first endpoint, the feature logic defining a proxy server feature and an event handler that indicates a response to an event, the feature logic operable to instruct the first endpoint to:
      initiate a proxy server feature at a first endpoint of a plurality of endpoints, wherein each endpoint of the plurality of endpoints is operable to provide the sexy server feature, and wherein initiating the proxy server feature at the first endpoint of the plurality of endpoints further comprises:
         accessing the feature logic using the service framework at the first endpoint, the feature logic stored on the first endpoint operating as the proxy server; and
         initiating the proxy server feature by executing the feature logic stored on the first endpoint;
      receive registration information corresponding to the plurality of endpoints, the registration information corresponding to an endpoint comprising an address for the endpoint, and wherein receiving the registration information corresponding to the plurality of endpoints further comprises:
         broadcasting registration information from the first endpoint to one or more other endpoints of the plurality of endpoints; and
         receiving at the first endpoint registration information from the other endpoints of the plurality of endpoints;
      record the registration information in a routing table at the first endpoint; and
      locate a callee endpoint of the plurality of endpoints using the routing table in order to establish a session with the callee endpoint;
      intercept an endpoint state process of the session at a feature interaction point; and
      determine a next state of the endpoint state process according to a feature finite state machine corresponding to the feature interaction point;
      determine whether the event occurs; and
      if the event occurs, access a web page stored on the first endpoint to determine whether the web page includes the event handler for the event and respond to the event according to instructions within the event handler stored on the first endpoint.

22. A system for providing a proxy server feature, comprising:
   means for initiating a proxy server feature at a first endpoint of a plurality of endpoints, wherein each endpoint of the plurality of endpoints is operable to provide the sexy server feature, and wherein means for initiating the proxy server feature at the first endpoint of the plurality of endpoints further comprises:
      means for accessing feature logic using a service framework at the first endpoint, the feature logic stored on the first endpoint operating as the proxy server, the feature logic defining the proxy server feature and an event handler that indicates a response to an event; and
      means for initiating the proxy server feature by executing the feature logic stored on the first endpoint;
   means for receiving registration information corresponding to the plurality of endpoints, the registration information corresponding to an endpoint comprising an address for the endpoint, and wherein receiving the registration information corresponding to the plurality of endpoints further comprises:
      broadcasting registration information from the first endpoint to one or more other endpoints of the plurality of endpoints; and
      receiving at the first endpoint registration information from the other endpoints of the plurality of endpoints;
   means for storing the registration information in a routing table at the first endpoint; and
   means for locating a callee endpoint of the plurality of endpoints using the routing table in order to establish a session with the callee endpoint;
   means for intercepting an endpoint state process of the session at a feature interaction point; and
   means for determining a next state of the endpoint state process according to a feature finite state machine corresponding to the feature interaction point;
   means for determining whether the event occurs; and
   if the event occurs, means for accessing a web page stored on the first endpoint to determine whether the web page includes the event handler for the event and means for responding to the event according to instructions within the event handler stored on the first endpoint.

23. A method for providing a proxy server feature, comprising:
   initiating a proxy server feature at a first endpoint of a plurality of endpoints, each endpoint of the plurality of endpoints operable to provide the proxy server feature, the proxy server feature initiated by:
      accessing feature logic using a service framework at the first endpoint, the feature logic defining the proxy server feature and an event handler that indicates a response to an event; and
      initiating the proxy server feature by executing the feature logic stored on the first endpoint;
   receiving registration information corresponding to the plurality of endpoints, the registration information corresponding to an endpoint comprising an address for the endpoint, the registration information received by performing at least one of the following processes:
      a first process comprising broadcasting registration information from the first endpoint to the other endpoints of the plurality of endpoints, and receiving at the first endpoint registration information from the other endpoints of the plurality of endpoints;
      a second process comprising receiving at the first endpoint registration information from a second endpoint of the plurality of endpoints, and providing the registration information to a third endpoint of the plurality of endpoints; and a third process comprising instructing the other endpoints to register at the first endpoint, and receiving at the first endpoint registration information from the other endpoints at the first endpoint;

storing the registration information in a routing table at the first endpoint; and locating a callee endpoint of the plurality of endpoints using the routing table, the callee endpoint located by:

receiving an invite message from a caller endpoint of the other endpoints; and locating the callee endpoint in response to receiving the invite message in order to establish a session with the callee endpoint;

intercept an endpoint state process of the session at a feature interaction point; and determine a next state of the endpoint state process according to a feature finite state machine corresponding to the feature interaction point, the first endpoint comprising a primary endpoint, the plurality of endpoints comprising a secondary endpoint operable to provide the proxy server feature if the primary endpoint fails to provide the proxy server determining whether the event occurs; and if the event occurs, accessing a web page stored on the first endpoint to determine whether the web page includes the event handler for the event and responding to the event according to instructions within the event handler stored on the first endpoint.

* * * * *